United States Patent [19]

Bång

[11] 3,718,285
[45] Feb. 27, 1973

[54] PRODUCTION OF LONG CHIPS AND PRODUCTS MADE FROM SAME

[76] Inventor: Erik Börje Bång, Kolonivagen 5, Vaxjo, Sweden

[22] Filed: Dec. 3, 1970

[21] Appl. No.: 94,730

[30] Foreign Application Priority Data

Dec. 3, 1969 Sweden..............................16666/69

[52] U.S. Cl....................................241/28
[51] Int. Cl...............................B27l 11/08
[58] Field of Search........................241/28

[56] References Cited

UNITED STATES PATENTS

| 2,380,214 | 7/1945 | Burrell | 241/28 X |
| 3,016,324 | 1/1962 | Textor | 241/28 X |
| 2,532,660 | 12/1950 | Care | 241/28 X |
| 2,592,594 | 4/1952 | Ottersland et al. | 241/28 |
| 2,947,655 | 8/1960 | Eberhardt | 241/28 X |
| 3,311,308 | 3/1967 | Jacquelin | 241/28 |
| 3,411,720 | 11/1968 | Jones et al. | 241/28 |
| 3,533,563 | 10/1970 | Eriksson | 241/28 |

Primary Examiner—Granville Y. Custer, Jr.
Attorney—Young & Thompson

[57] ABSTRACT

Long chips or bundles of fiber are produced from wood by exposing the wood to shearing stresses obtained by forces produced by pressing jaws or similar means against the surface of the wood or by forces causing torsion in the wood around an axis parallel to the direction of fiber. Additionally the stresses may be caused by flexure around an axis perpendicular to the direction of fiber and/or by cutting parallel to the direction of fiber. Pressing perpendicular to the direction of fiber may also occur.

1 Claim, 10 Drawing Figures

- ROUND TIMBER IN
- CUTTING UP — COMPOSITE SHEARING
- CALIBRATING — MAX. CROSSECTION DETERMINED
- CLEANSING — BRANCHES, BARK, ETC. REMOVED
- SORTING — SORTING OF CHIP LENGTHS
- PARALLELLING — PARALLELLING OF CHIPS
- BINDER — BINDER ADDED
- PRESSING — FORMING, HEATING, PRESSURE
- FINAL PRODUCT

PRODUCTION OF LONG CHIPS AND PRODUCTS MADE FROM SAME

The production of various products of wood or cellulose usually begins with chips or shavings. Wood is cut up in cutting machines into chips or shavings having dimensions adapted to suit the purpose. Since in the cutting a large number of cellulose fibers are cut off, this procedure is not advantageous for such products where the strength of the fiber produced is important. Attempts have been made to finely divide the wood in such a way that the cellulose fibers remain intact, e.g. by grinding to produce wood pulp, but all previous processes were plagued with drawbacks and were suitable for only certain limited ranges of use. In cutting machines, only relatively small variation in the dimensions of the chip is allowed, and with the rapid wearing out of the knives, the properties and qualities of the chip will be uneven with the use of dull knives.

The present invention relates to a method of cutting up wood by subjecting it at suitable localized regions to such strain that the stresses in the material exceed the breaking point. Shearing stresses ought preferably to be applied since the shearing strength of the timber is considerably lower than the breaking point for normal stresses. According to this method, no cutting tool is used which can shear the fiber.

The stresses required for comminuting the wood are obtained by subjection to flexural, torsional and shearing forces All these give shearing stresses which tend to comminute the wood into long-strip particles which are severed by rupturing along the fiber direction, as so-called long chips.

Long-chip products can be shaped in a number of different ways. However, to obtain strength and favorable appearance, the chip is preferably aligned in the longitudinal direction of the product. Long-chip products can be produced by different procedures, e.g. by injection moulding or by pressing processes similar to chip board production. However, the strength will be greater than for chip boards since the length of the chip can be kept greater.

Because of the greater strength, planks for carpentry purposes can be made from such long chips. Such planks can be provided, during production with a clean surface and good dimensional accuracy, as well as greater dimensional stability than ordinary wood. Planks of desired length can be delivered without wastage from cutting. Further machining with chip breaking machines can be conventionally carried out.

Lengths with desired profile can be produced by injection and pressing in order to attain material saving and shapes adapted to suit functional, appearance and strength demands. Subsequent machining can thereby be reduced to a minimum.

Products such as furniture having single or double curved surfaces can be made by compression moulding. The chip is thereby suitably aligned in the prevailing major stress directions. Larger boards of the same type as common chip boards can be produced with the long chips parallelly aligned. The directions in the layers of laminated products can form a certain angle with each other and a cheaper material can be used in the core of the board or profile. If the long chip is pressed loose and unarranged, what is obtained is a porous board similar to excelsior boards.

Surface finishing of long-chip products can be done conventionally, e.g. by coloring, painting, lacquering or plastic coating in combination with heat treatment or ionized radiation.

A long chip according to the invention has a relatively continuously oblong shape. Therefore, it is suitable for reinforcing products subjected to e.g. flexural (bending) or tensile stresses. The products thus obtain greater strength than if only shorter chips are used.

In the production, one can begin with round timber which is sheared into chips having a smaller cross section but relatively great length. Smallwood can be advantageously used. The once-sheared parts are again sheared to an even smaller cross section, etc. so that after successive comminutions, a final product is obtained in the form of a long chip. The cross sectional dimension of the final product can be a few mm.

The accompanying drawings show how the shearing stresses directed along the fibers in the timber are obtained.

Figure 4:
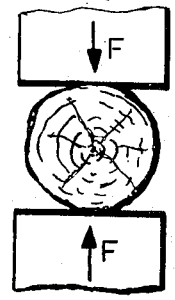

FIG. 4 compression perpendicular to the fibers.

Figure 5:
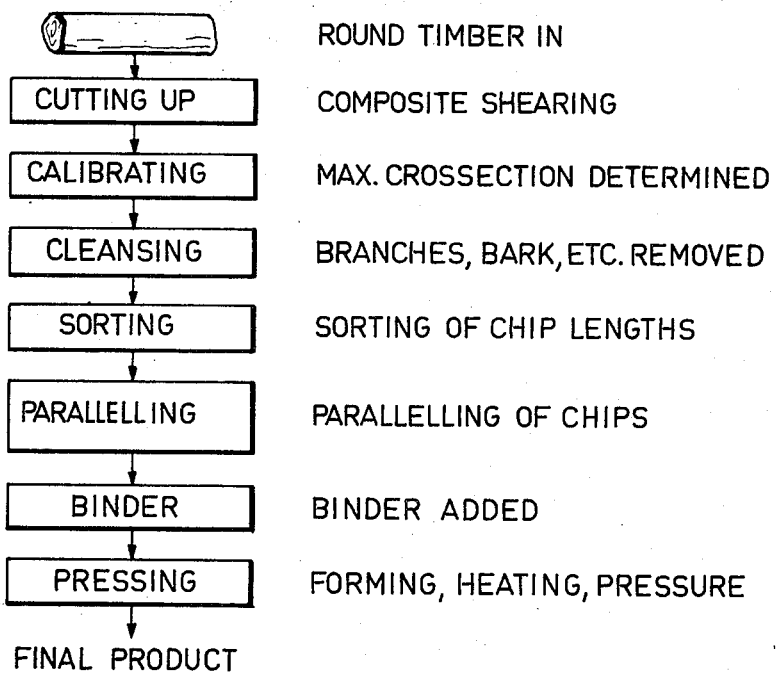

FIG. 5 is a diagram of the production of long chips and products thereof.

Figure 6:
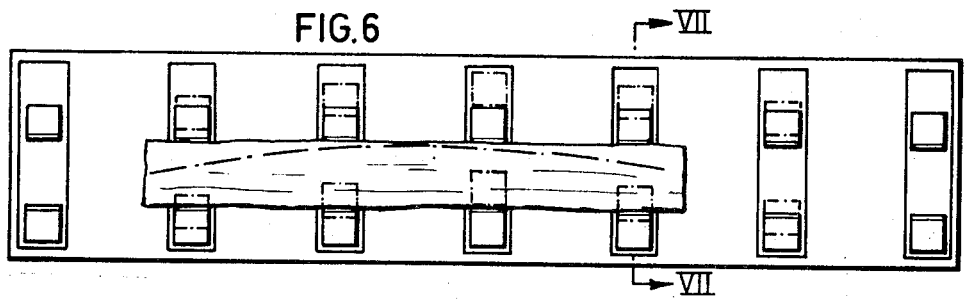

FIG. 6 shows a machine for producing the long chip.

Figure 7:
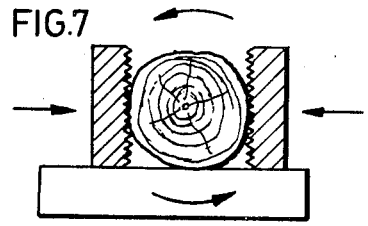
Figure 8:
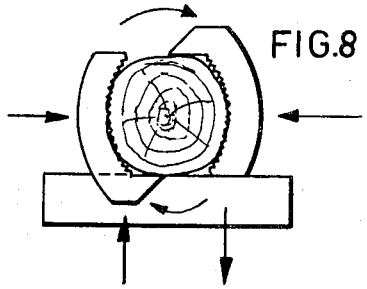

FIG. 7 shows part of a cross section along the line VII—VII on FIG. 6 showing a pair of jaws and FIG. 8 an alternative embodiment of machine details shown in FIG. 7, for simultaneous shearing of the object and cutting.

Figure 9:
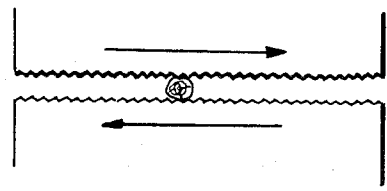

FIG. 9 shows another embodiment of comminution by shearing.

Figure 1A:
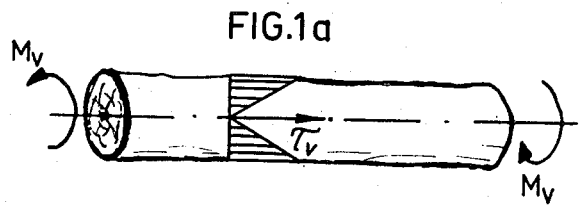
FIG. 1a shows the torsion of the timber around an axis parallel to the fiber direction.
Figure 1B:
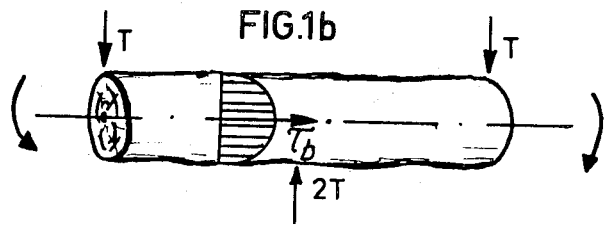
FIG. 1b shows flexure around an axis perpendicular to the fiber direction.
Figure 3:
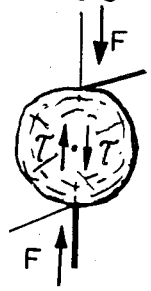
FIG. 3 shows shearing along the fibers.

In FIGS. 1a and 1b, it is also shown how the shearing stress $\tau$ is distributed over the cross section. The torque has been marked $M_v$ and the flexural shearing force T. The force applied is denoted F in FIGS. 3 and 4.

The different load conditions according to the Figures can, if necessary, be combined in a suitable way. The stress can also be varying, alternating or pulsating, with the desired amplitude and frequency.

Figure 2:
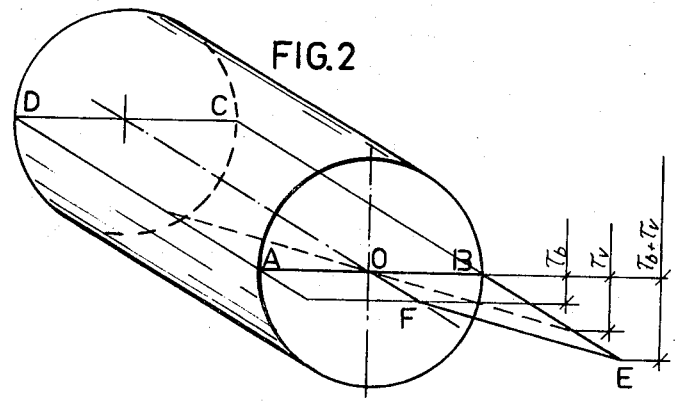
FIG. 2 shows composite shearing stresses.

With combined stress, an augmented comminuting effect is obtained since the resulting shearing stress will equal the sum of the separate stresses. As an example, the combined torsion and flexure can give high resulting shearing stresses at certain points on the periphery of the wood cross section. In this way, the shearing stress diagrams could be superimposed on each other. FIG. 2 shows by example how the line OB on the neutral surface ABCD in a log is affected by resulting shearing stresses caused by flexure and torsion. Their magnitudes are represented by the diagram OBEF with the greatest value being BE applied at the point B.

In order to make long chips according to the invention, entirely new machinery is required. As an example of a suitable embodiment, a machine could be considered which has jaws between which the wood is gripped. The jaws can be arranged in pairs with suitable division in the longitudinal direction of the log (see FIG. 6). The force exerted by the jaws is so great that there can be no slipping on the wood surface (see FIG. 7).

Each jaw pair is given such a movement relative to the other jaw pairs that the object is deformed by the movement of said jaws, thus resulting in the intended inner stresses in the wood. The main movement of the jaws is constituted by relative parallel displacement and torsion.

The parallel displacement is so adapted that the object receives a curved center line, whereby shearing forces occur in the wood resulting in a curved shearing stress distribution according to the diagram in FIG. 1*b*. The torsion in each pair of jaws occurs in a plane perpendicular to the neutral line of the timber. In this way, there results a torque in the wood with torsional shearing stress according to FIG. 1*a*.

Because the jaws are given a larger surface and are pressed with greater force against each other, a crushing effect on the wood is obtained (see FIGS. 4 and 7). The jaws can also be made to have a cutting effect on the timber. If so, they are shaped in part according to FIG. 8 and are relatively displaced parallelly in tangential direction according to the arrows indicating force on FIG. 3, or with a composite, also torsional and/or pressing movement.

As the comminution of the wood proceeds, the process can be repeated with smaller machine units.

The final step is a calibration of the chip cross section, effected e.g. as a combined crushing-cutting operation according to the above, between planar members with e.g. corrugated surfaces (see FIG. 9).

The finished long chip ought to have a length of 50 to 150 mm and a cross section of 1 to 20 mm, preferably 2 to 8 mm. The finished chip is cleansed of small particles, branches and bark by screening and is sorted according to its length. Depending on the use, it can then be parallelled to produce products with great flexure and tensile strength. After required additions of binders, glue or plastic, the chip is injected or pressed at high pressure and suitable temperature to products with the desired properties and dimensions.

What I claim is:

1. A method for producing long chips of wood, comprising grasping a wood log between a plurality of pairs of jaws that are spaced apart lengthwise of the log, moving the pairs of jaws with the log grasped between them relative to each other in directions perpendicular to the axis of the log to bend the log, and with the log thus bent rotating the pairs of jaws with the log grasped between them relative to each other about said axis to apply to the log combined bending and torsional stresses to comminute the log.

* * * * *